(12) United States Patent
Nishiyama (10) Patent No.: US 10,486,506 B2
(45) Date of Patent: Nov. 26, 2019

(54) VEHICLE SUN VISOR

(71) Applicant: YAZAKI CORPORATION, Tokyo (JP)

(72) Inventor: Noritaka Nishiyama, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/009,279

(22) Filed: Jun. 15, 2018

(65) Prior Publication Data

US 2018/0361836 A1 Dec. 20, 2018

(30) Foreign Application Priority Data

Jun. 20, 2017 (JP) .................................. 2017-120230

(51) Int. Cl.
  *B60J 3/02* (2006.01)
  *B60Q 3/252* (2017.01)
  *B60R 16/03* (2006.01)

(52) U.S. Cl.
  CPC ............ *B60J 3/0217* (2013.01); *B60Q 3/252* (2017.02); *B60R 16/03* (2013.01)

(58) Field of Classification Search
  CPC ........ B60J 3/217; B60J 3/0221; B60J 3/0252; B60Q 3/252
  USPC ........................................... 296/97.12, 97.13
  See application file for complete search history.

(56) References Cited

U.S. PATENT DOCUMENTS

| 6,139,083 | A | * | 10/2000 | Fischer | B60J 3/0239 |
| | | | | | 296/97.11 |
| 7,108,309 | B2 | | 9/2006 | Garcia | |
| 2002/0094719 | A1 | * | 7/2002 | Sawayanagi | B60J 3/0221 |
| | | | | | 439/545 |
| 2002/0149224 | A1 | * | 10/2002 | Wilson | B60J 3/0217 |
| | | | | | 296/97.5 |
| 2005/0104409 | A1 | * | 5/2005 | Garcia | B60J 3/0221 |
| | | | | | 296/97.9 |
| 2011/0260491 | A1 | | 10/2011 | Ebisuoka | |
| 2017/0021702 | A1 | * | 1/2017 | Jin | B60J 3/0221 |
| 2018/0361834 | A1 | * | 12/2018 | Nishiyama | B60J 3/0217 |
| 2018/0361835 | A1 | * | 12/2018 | Kawashima | B60J 3/0217 |

(Continued)

FOREIGN PATENT DOCUMENTS

JP  2011-230559 A  11/2011

*Primary Examiner* — Jason S Morrow (74) *Attorney, Agent, or Firm* — Metrolex IP Law Group, PLLC (57) ABSTRACT

A vehicle sun visor has a sun visor body including an electrical component, a non-conductive arm including a cylindrical-end portion on which contact parts of a pair of conductor are arranged and rotatably holding the sun visor body, a mounting bracket configured to mount the non-conductive arm to a vehicle, and a connector detachably attached to the mounting bracket and including a pair of terminals each having a contact portion to contact with a corresponding contact part of the pair of conductors and configured to supply electric power. The mounting bracket includes an arm-supporting portion rotatably supporting a cylindrical-end-portion side of the non-conductive arm. The contact parts of the pair of conductors are formed in an arcuate-plate shape. The contact parts in arcuate-plate shape are arranged via a gap on an outer peripheral surface of the cylindrical-end portion exposed outside the arm-supporting portion of the non-conductive arm.

4 Claims, 10 Drawing Sheets

(56) References Cited

U.S. PATENT DOCUMENTS

2018/0370341 A1* 12/2018 Shimizu ................ B60J 3/0217
2019/0061485 A1*  2/2019 Nishiyama ............ B60J 3/0217

* cited by examiner

VEHICLE SUN VISOR

CROSS REFERENCE TO RELATED APPLICATIONS

This application claims the priority of Japanese Patent Application No. 2017-120230, filed on Jun. 20, 2017, the entire content of which are incorporated herein by reference.

BACKGROUND

Technical Field

The present invention relates to a vehicle sun visor with illumination arranged in the vicinity of an upper end of a front window of a front seat of a vehicle.

Related Art

Figure 10:
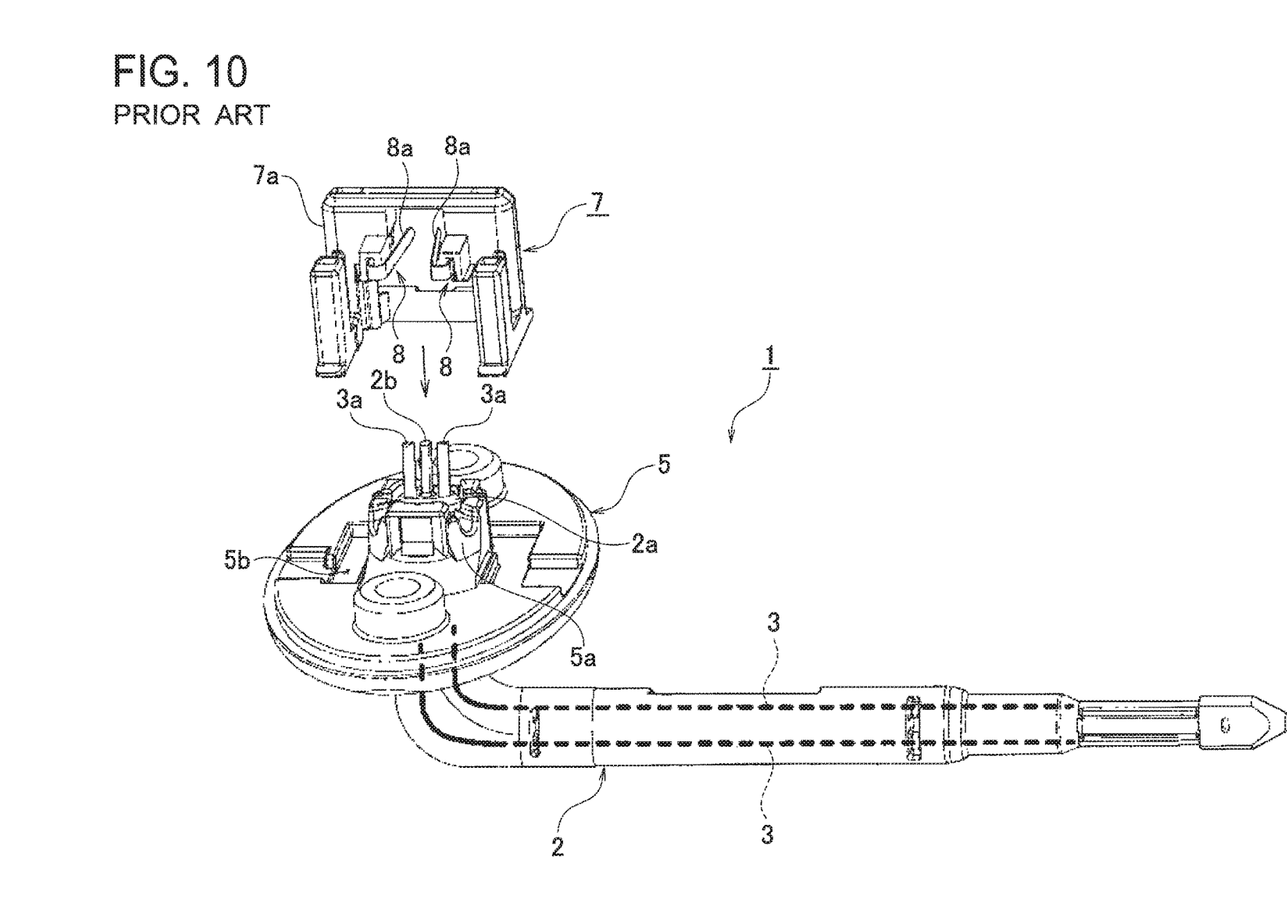
FIG. 10 is a perspective view showing a periphery of a mounting bracket of a conventional vehicle sun visor.

A vehicle sun visor of this type is disclosed in JP 2011-230559 A. As shown in FIG. 10, the vehicle sun visor 1 includes a non-conductive support shaft (arm) 2 for rotatably holding a sun visor body (not shown), a mounting bracket 5 for mounting the support shaft 2 to a ceiling of a vehicle cabin (not shown), and a connector 7 detachably assembled to the mounting bracket 5 and having a pair of terminals 8 and 8 for supplying electric power.

A pair of conductors 3 and 3 extending in parallel is arranged inside the support shaft 2. Each columnar conductor end portion 3a serving as the contact parts of a pair of conductors 3 and 3 is provided on the closed upper surface of an end portion 2a toward the mounting bracket 5 so as to protrude outward. The pair of columnar conductor end portions 3a and 3a is spaced apart from each other, having a space, via a non-conductive intervening portion 2b protruding to the center of the upper surface of the end portion 2a of the support shaft 2.

The end portion 2a of the support shaft 2 is rotatably supported by a cylindrical support protrusion portion 5a of the mounting bracket 5, and a housing 7a of the connector 7 is assembled to a mounting recess portion 5b of the mounting bracket 5.

When the support shaft 2 is rotated to a first position, the pair of columnar conductor end portions 3a and 3a protruding outward from the end portion 2a contacts each spring portion 8a of the pair of terminals 8 and 8 for supplying electric power to be brought into an energized (ON) state, whereby a lighting preparation state of the illumination lamp of the sun visor body is formed.

When the support shaft 2 is rotated to the second position, the pair of columnar conductor end portions 3a and 3a protruding outward from the end portion 2a is away from each spring portion 8a of the pair of terminals 8 and 8 for supplying electric power to be in a non-conducting (OFF) state.

SUMMARY

However, in the conventional vehicle sun visor 1, when assembling the housing 7a of the connector 7 to the mounting recess portion 5b of the mounting bracket 5 to which the support shaft 2 is assembled, the housing 7a can be assembled even when the support shaft 2 is arranged at any position. As a result, the columnar conductor end portion 3a serving as the contact part protruding outward from the end portion 2a of the support shaft 2 and the plate-shaped spring portion 8a as the contact part of the terminal 8 assembled to the housing 7a of the connector 7 may interfere to each other in some cases. If the connector 7 is forcibly assembled to the mounting bracket 5 in this interference state, the plate-shaped spring portion 8a of the terminal 8 may be deformed by the columnar conductor end portion 3a, and conduction failure and resistance instability may occur.

The present invention has been made to solve the above-mentioned problems, and it is an object of the present invention to provide a vehicle sun visor capable of preventing a spring portion of a terminal from deforming due to a contact part of a conductor during assembly of a connector and preventing conduction failure and resistance instability from occurring.

A vehicle sun visor according to the present invention has a sun visor body including an electrical component, a non-conductive arm including a cylindrical-end portion on which contact parts of a pair of conductors are arranged and rotatably holding the sun visor body, a mounting bracket configured to mount the non-conductive a to a vehicle, and a connector detachably attached to the mounting bracket and including a pair of terminals each having a contact portion to contact with a corresponding contact part of the pair of conductors and configured to supply electric power. The mounting bracket includes an arm-supporting portion rotatably supporting a cylindrical-end-portion side of the non-conductive arm. The contact parts of the pair of conductors are formed in an arcuate-plate shape. The pair of arcuate-plate shape contact parts is arranged via a gap on an outer peripheral surface of the cylindrical-end portion exposed outside the arm-supporting portion of the non-conductive arm.

A recess for attaching the connector may be provided in the gap between the pair of arcuate-plate shape contact parts on the outer peripheral surface of the cylindrical-end portion of the non-conductive arm.

A spring-portion-displacing protrusion configured to lift the contact portion provided on a spring portion of the terminal wherein the spring portion elastically deforms may be provided on a lower position of the recess for attaching the connector wherein the recess is provided on the cylindrical-end portion of the non-conductive arm.

A guide portion may be provided at a position of the spring portion wherein the position is faced with the spring-portion-displacing protrusion.

A lower guide piece configured to guide the spring portion when attaching the connector and a lateral guide piece configured to guide the spring portion when rotating the non-conductive arm may be provided on the guide portion of the terminal.

In the vehicle sun visor according to one aspect of the present invention, a pair of arcuate-plate shape contact parts is provided via a gap on the outer peripheral surface of the cylindrical-end portion of the arm wherein the outer peripheral surface is exposed outside the arm-supporting portion of the mounting bracket. Thus, when assembling the connector to the mounting bracket by which the cylindrical-end portion of the arm is rotatably supported, a pair of arcuate-plate shape contact parts provided on the outer circumferential surface of the cylindrical-end portion of the arm and each spring portion having contact portions of a pair of terminals configured to supply electric power to the connector do not interfere with each other even if they come into contact with each other. As a result, the vehicle sun visor can reliably prevent each spring portion of the pair of terminals from deforming, and prevent conduction failure and resistance instability from occurring.

BRIEF DESCRIPTION OF DRAWINGS

FIG. 6 is a side view showing a state in which the connector is being assembled to the mounting bracket;

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

Figure 1:
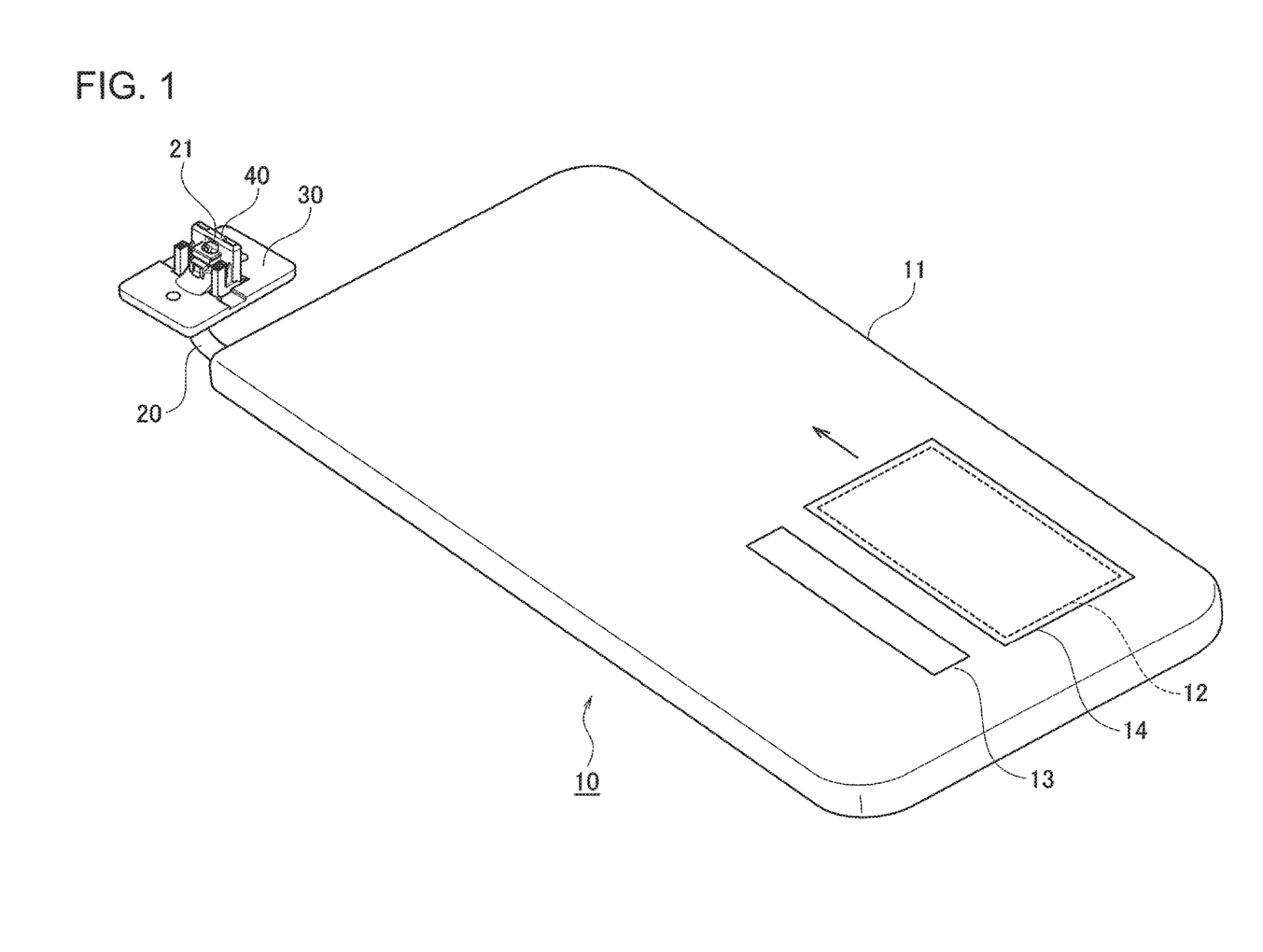
FIG. 1 is a perspective view of a vehicle sun visor according to one embodiment of the present invention.
Figure 2:
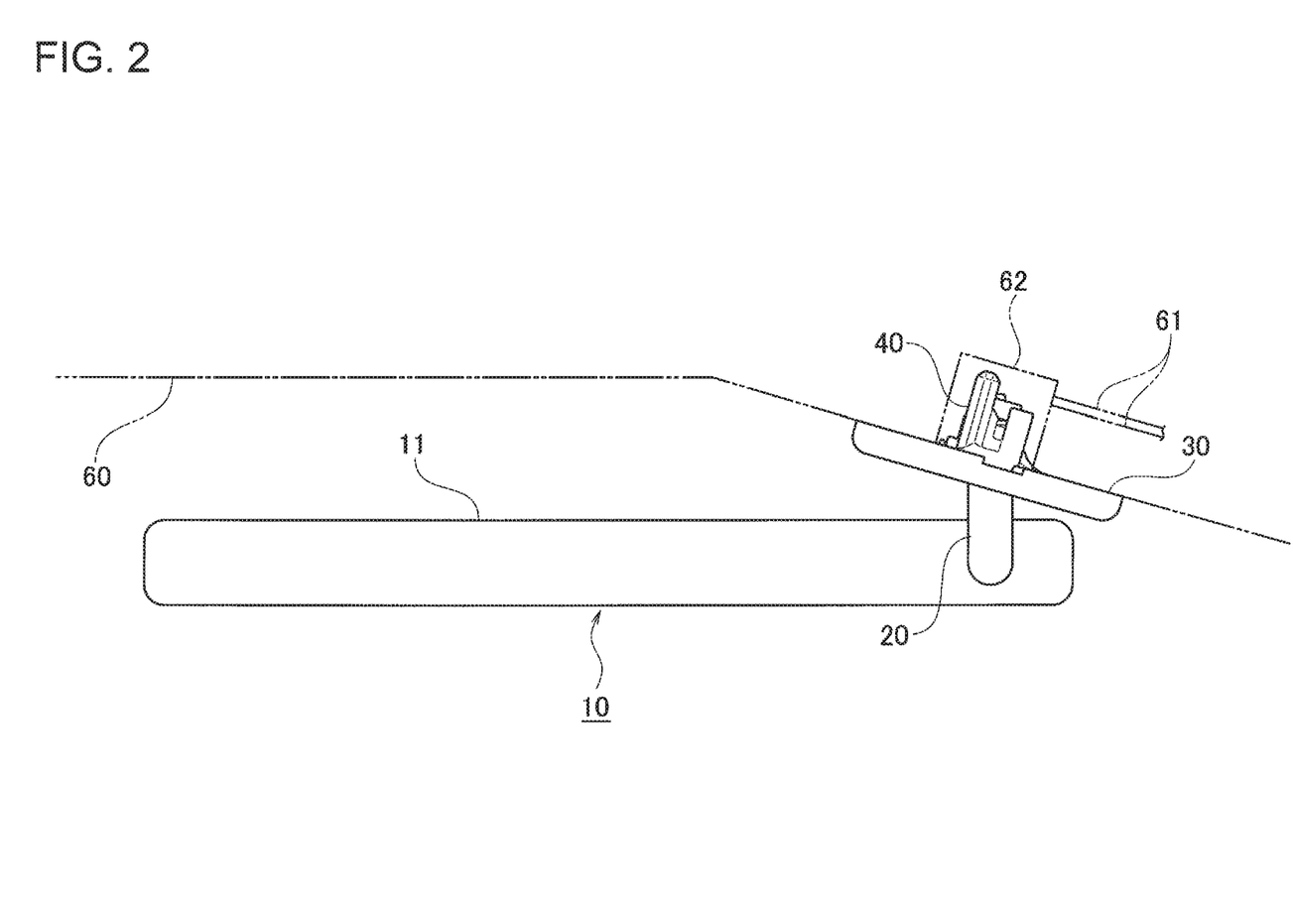
FIG. 2 is a side view showing a state in which the vehicle sun visor is stored toward a ceiling of a cabin.
Figure 3:
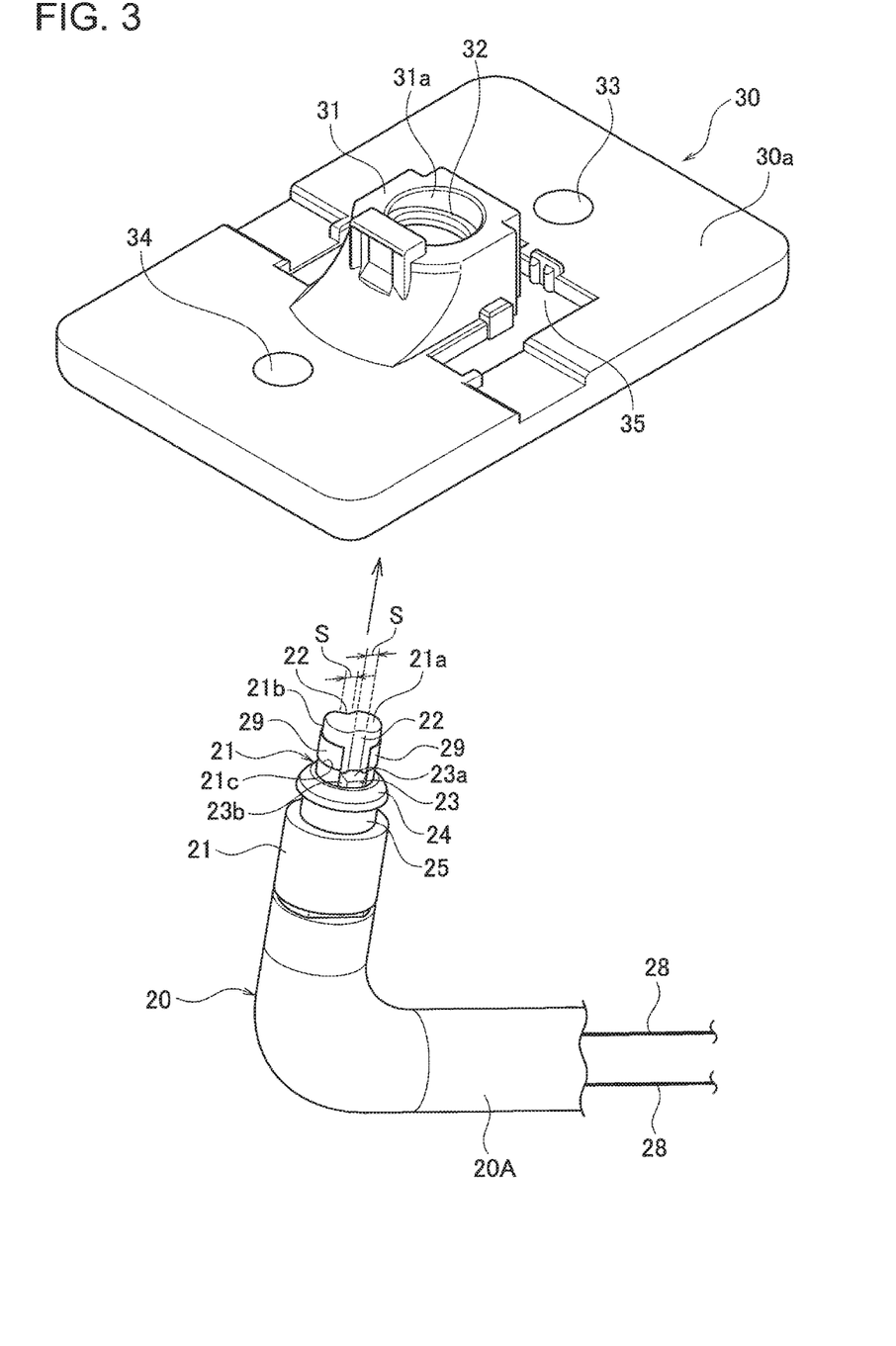
FIG. 3 is a perspective view showing a state before the cylindrical-end portion of an arm is press-fitted to a mounting bracket of the vehicle sun visor.
Figure 4:
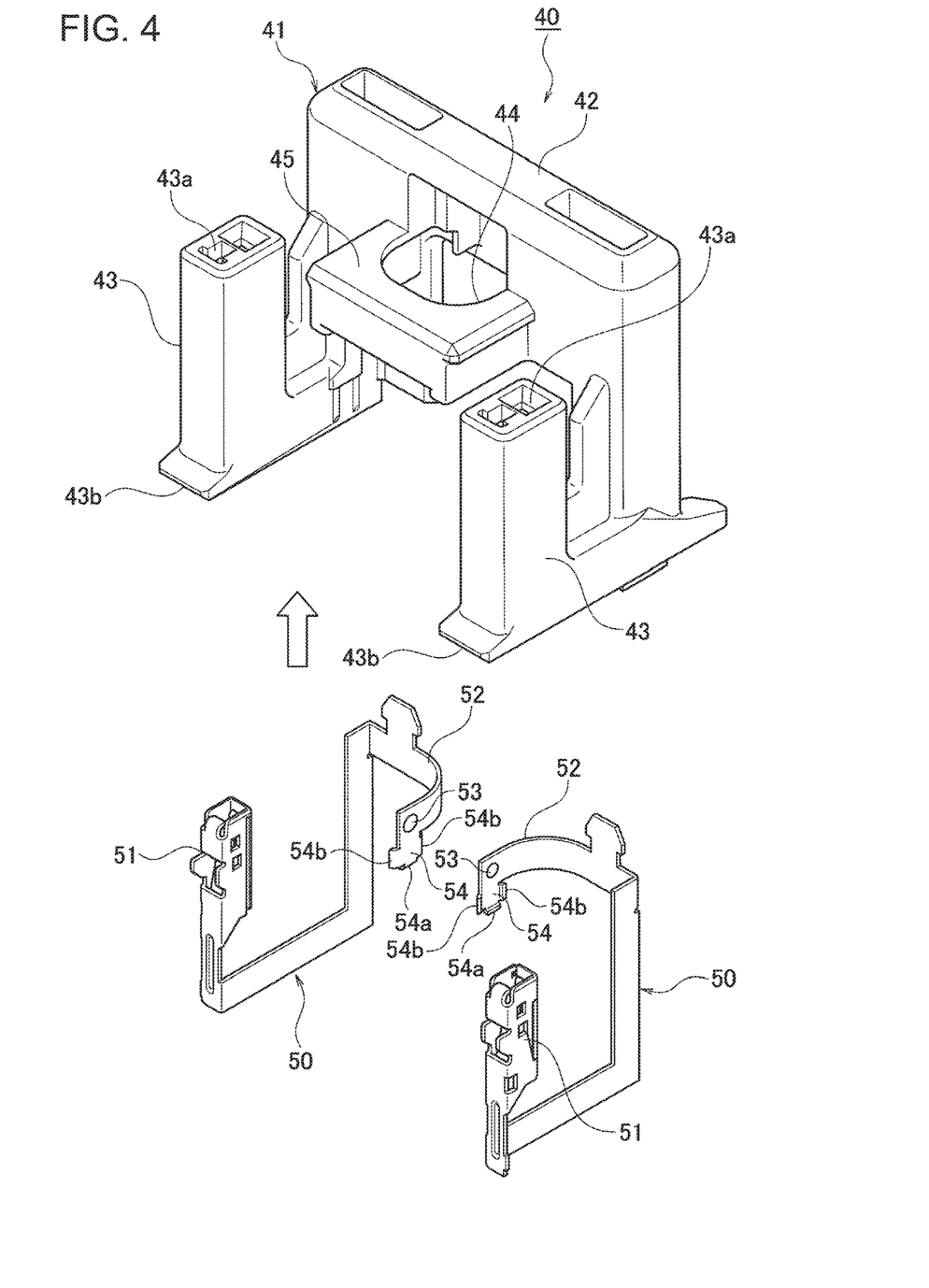
FIG. 4 is a perspective view showing a state before a pair of terminals is inserted into a connector of the vehicle sun visor.
Figure 5:
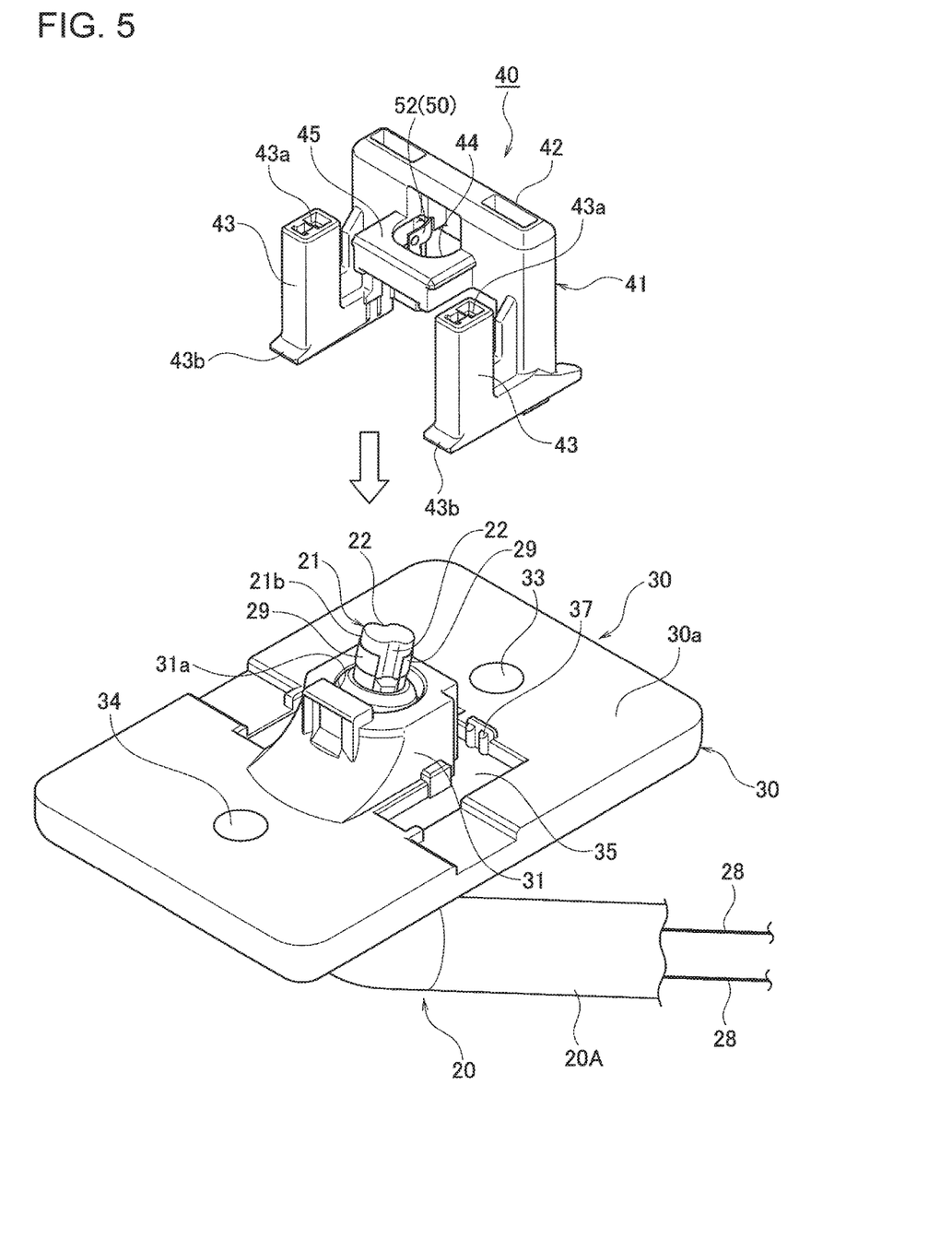
FIG. 5 is a perspective view showing a state before the connector is assembled to the mounting bracket to which the arm is attached.
Figure 7A:
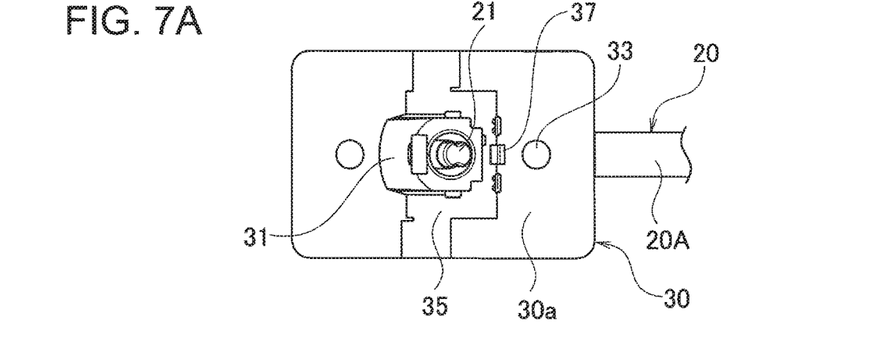
FIG. 7A is a plan view showing the positional relations between the mounting bracket and the arm when the connector is assembled.
Figure 7B:
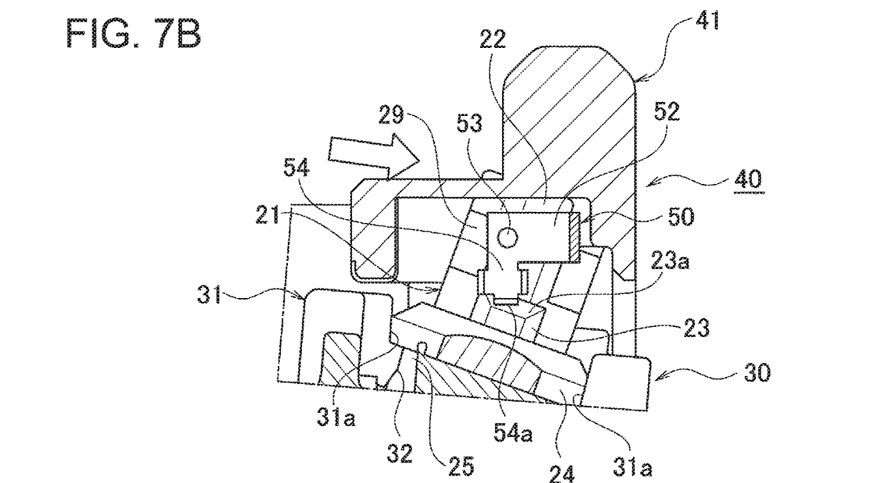
FIG. 7B is a side view of a principal part in a state of assembling the connector to the mounting bracket.
Figure 7C:
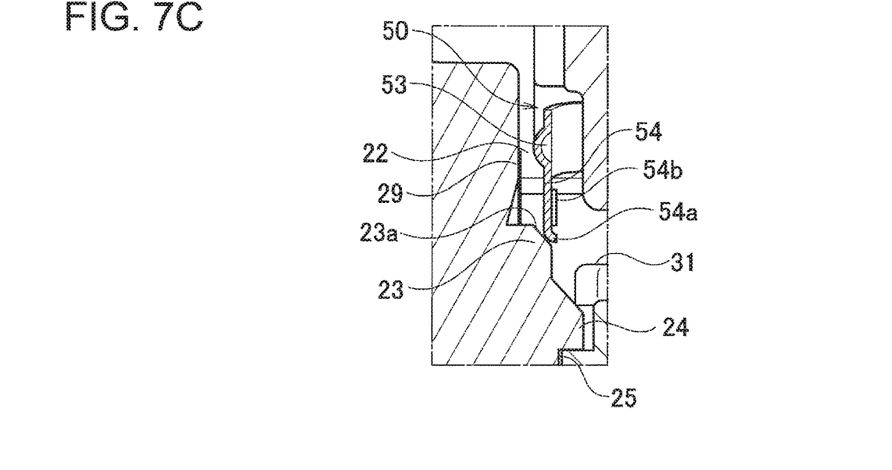
FIG. 7C is a cross-sectional view of the principal part in a state of assembling the connector to the mounting bracket.
Figure 8:
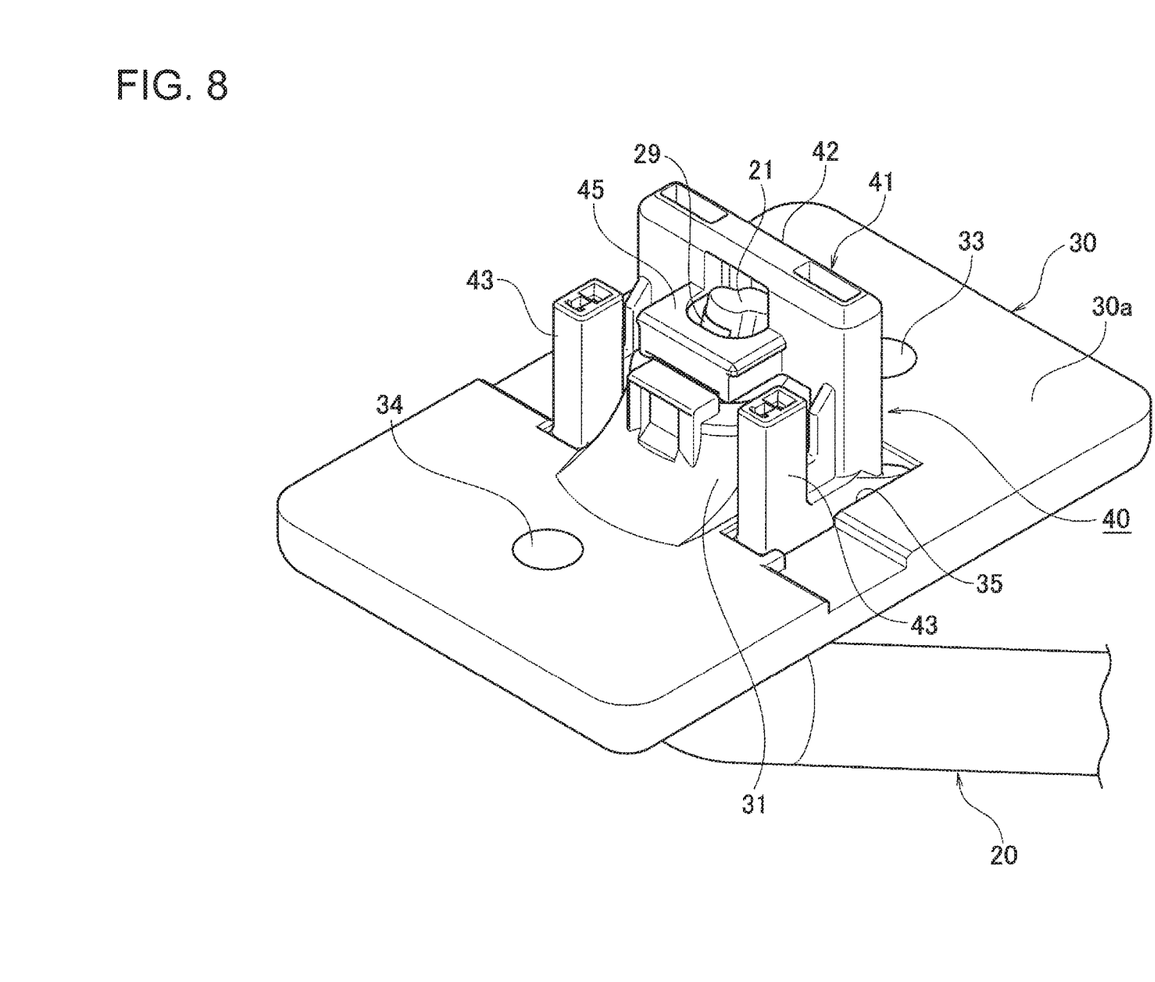
FIG. 8 is a perspective showing a state in which the connector has been assembled to the mounting bracket.
Figure 9A:
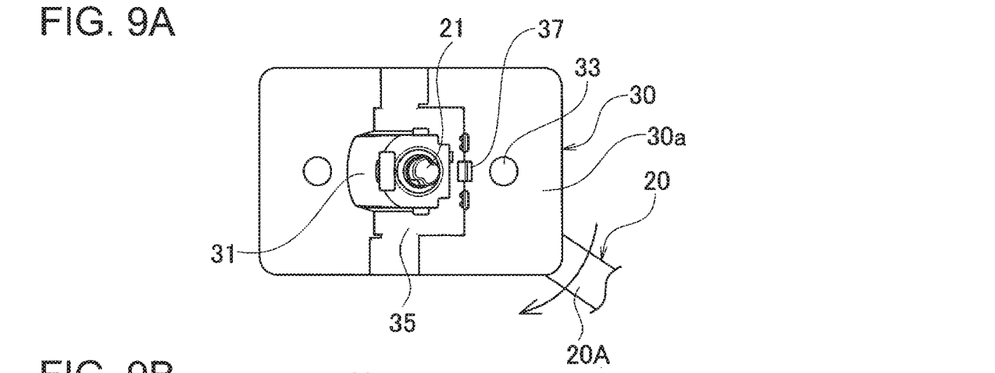
FIG. 9A is a plan view showing the positional relations between the mounting bracket and the arm when the arm is rotated after the connector has been assembled.
Figure 9B:
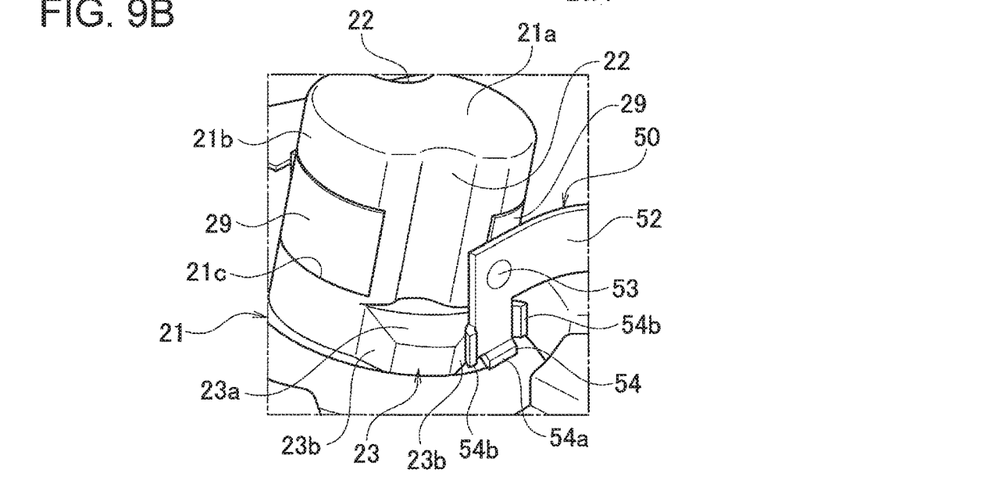
FIG. 9B is a perspective view of a principal part before a contact part of the terminal of the connector is lifted when the arm is rotated.
Figure 9C:
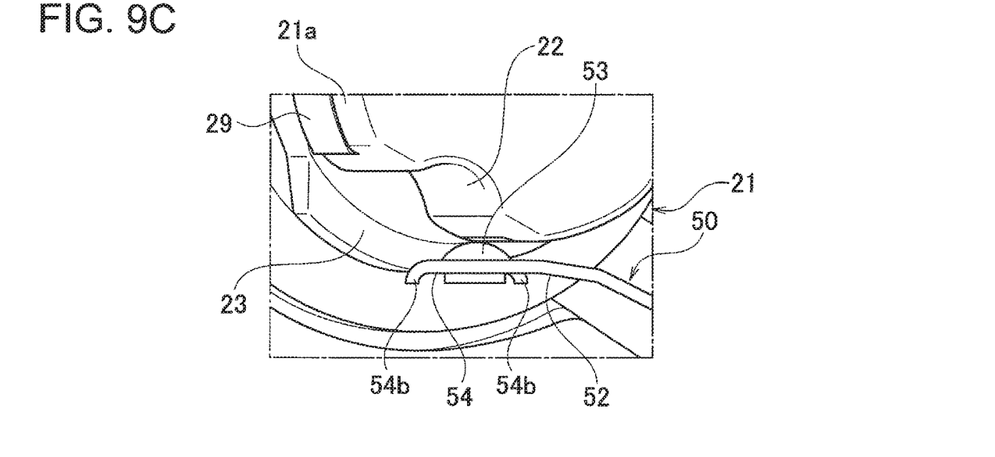
FIG. 9C is a perspective view as viewed from above of the principal part before a contact part of the terminal of the connector is lifted when the arm is rotated.

FIG. 1 is a perspective view of a vehicle sun visor according to one embodiment of the present invention, FIG. 2 is a side view showing a state in which the vehicle sun visor is stored toward a ceiling of a cabin, FIG. 3 is a perspective view showing a state before the cylindrical-end portion of an arm is press-fitted to a mounting bracket of the vehicle sun visor, FIG. 4 is a perspective view showing a state before a pair of terminals are inserted into a connector of the vehicle sun visor, FIG. 5 is a perspective view showing a state before the connector is assembled to the mounting bracket to which the arm is attached, FIG. 6 is a side view showing a state in which the connector is being assembled to the mounting bracket, FIG. 7A is a plan view showing the positional relations between the mounting bracket and the arm when the connector is assembled, FIG. 7B is a side view of a principal part in a state of assembling the connector to the mounting bracket, FIG. 7C is a cross-sectional view of the principal part, FIG. 8 is a perspective showing a state in which the connector has been assembled to the mounting bracket, FIG. 9A is a plan view showing the positional relations between the mounting bracket and the arm when the arm is rotated after the connector has been assembled, FIG. 9B is a perspective view of a principal part before a contact part of the terminal of the connector is lifted when the arm is rotated, and FIG. 9C is a perspective view of the principal part as viewed from above.

As shown in FIGS. 1 and 2, the vehicle sun visor 10 includes a sun visor body 11 having a vanity mirror (makeup mirror) 12 and an illumination lamp (electrical equipment) 13, a non-conductive arm 20 rotatably holding the sun visor body 11 and provided with each contact part 29 of a pair of conductors 28 and 28 at a cylindrical-end portion 21, a mounting bracket 30 for mounting the arm 20 to a roof trim (vehicle) 60, and a connector 40 detachably attached to the mounting bracket 30 and having a pair of terminals 50 and 50 for supplying electric power wherein the terminal has contact portion 53 being in contact with each contact part 29 of the pair of conductors 28 and 28.

As shown in FIGS. 3, 5, and 9A to 9C, the arm 20 is formed in a cylindrical shape with a synthetic resin. The arm 20 is formed so that the cylindrical-end portion 21 whose upper surface 21a is closed is inclined at a predetermined angle with respect to an arm body 20A. The pair of conductors 28 and 28 extending in parallel is routed inside the arm 20. Each contact part 29 of the pair of conductors 28 and 28 is formed in an arcuate-plate shape wherein the contact part 29 is exposed toward the cylindrical-end portion 21 of the arm 20 and positioned at the cylindrical-end portion 21 (hereinafter referred to as "a pair of arcuate-plate shape contact parts 29 and 29"). Further, an annular recessed groove portion 21c is formed at the center of a portion of the outer peripheral surface 21b of the cylindrical-end portion 21 of the arm 20 wherein the portion of the outer peripheral surface 21b is exposed outside an arm-supporting portion 31 of the mounting bracket 30, which will be described later. The pair of arcuate-plate shape contact parts 29 and 29 positioned on the ends of the pair of conductors 28 and 28 is arranged with a predetermined gap S in the annular recessed groove portion 21c. This pair of gaps S and S is a non-contact region between the pair of arcuate-plate shape contact parts 29 and 29 and each contact portion 53 of the pair of terminals 50 and 50.

As shown in FIGS. 3 and 9A to 9C, a groove portion (recess) 22 for connector assembling, which is arc recessed in section perpendicular to the axial direction, is formed to extend longitudinally along the axial direction in the gap S between the pair of arcuate-plate shape contact parts 29 and 29 on the outer peripheral surface 21b of the cylindrical-end portion 21 of the arm 20. Further, on the lower side of the pair of arcuate recessed groove portions 22 and 22 of the outer peripheral surface 21b of the cylindrical-end portion 21 wherein the arcuate recessed groove portions 22 and 22 are provided for mounting the connector, a spring-portion-displacing protrusion 23 which lifts the contact portion 53 provided at the distal end of a spring portion 52 of the pair of terminals 50 and 50 for supplying electric power, wherein the spring portion 52 elastically deforms, integrally protrudes and is formed.

Further, as shown in FIG. 3 and FIGS. 7A to 7C, an annular flange portion 24 is integrally protruded and formed on the lower side of the spring-portion-displacing protrusion 23 of the outer peripheral surface 21b of the cylindrical-end portion 21. Further, an annular recessed engagement groove (engagement portion) 25 is integrally formed on the lower side of the flange portion 24.

As shown in FIGS. 1 to 3 and FIGS. 5 to 9C, the mounting bracket 30 is made of a synthetic resin. A tubular arm-supporting portion 31 having a circular inner peripheral surface 31a rotatably supporting the cylindrical-end-portion 21 side of the arm 20 is integrally protruded and formed at the center of the mounting bracket 30. As shown in FIGS. 5 and 7B, the cylindrical-end portion 21 of the arm 20 is press-fitted to the inner peripheral surface 31a of the arm-supporting portion 31, and a locking protrusion (locking portion) 32 protruding from the inner peripheral surface 31a enters the annular recessed engagement groove 25 of the arm 20, and is engaged with the annular flange portion 24. Accordingly, the upper side of the cylindrical-end portion 21 of the rotating arm 20 protrudes outside the arm-supporting portion 31 such that the upper side is exposed.

As shown in FIG. 5, a recess 35 for assembling the connector is formed on both sides of the arm-supporting portion 31 on the upper surface 30a of the mounting bracket 30 and toward a mounting hole 33 of the mounting bracket 30. An engagement hole 36 into which a locking piece portion 43b of both side walls 43 and 43 of the connector 40 is fitted is formed on both sides of the recess 35 for assembling the connector toward a mounting hole 34, which is opposite the side of the mounting hole 33. In addition, as shown in FIGS. 5 and 6, a locking claw portion 37 to which the locking piece portion 42a of a housing body 42 of the connector 40 is locked is formed at the center of the recess 35 for assembling the connector toward the mounting hole 33. The mounting bracket 30 is screwed to a roof trim 60 by screws (not shown) via a pair of mounting holes 33 and 34.

As shown in FIG. 4, a housing 41 of the connector 40 is made of a synthetic resin. This housing 41 includes the housing body 42, a pair of side walls 43 and 43 having a L-shaped terminal receiving chamber 43a on both sides of the housing body 42, and a center wall 45 where a hollow portion 44 is formed between the center wall 45 and the center of the housing body 42. As shown in FIG. 5, when the housing 41 is assembled in the recess 35 for assembling the connector so that the pair of side walls 43 and 43 of the housing 41 is positioned on both sides of the arm-supporting portion 31 of the mounting bracket 30, as shown in FIG. 8, the cylindrical-end portion 21 of the arm 20 is exposed in the hollow portion 44 between the housing body 42 and the center wall 45.

As shown in FIG. 4, each terminal 50 whose distal end is a box-shaped terminal connection part 51 is formed in an L-shaped plate shape and housed in the L-shaped terminal receiving chamber 43a of the side wall 43 of the housing 41. In addition, the L-shaped plate spring portion 52 connected to the terminal connection part 51 of each terminal 50 is formed to be elastically deformable. In addition, the distal end of the spring portion 52 is provided with the semicircular spherical contact portion 53. Further, a guide portion 54 is provided at a position of the spring portion 52 of each terminal 50 wherein the position is faced with the spring-portion-displacing protrusion 23 formed on the cylindrical-end portion 21 of the arm 20. The guide portion 54 has a lower guide piece 54a for assembling the connector and a lateral guide piece 54b wherein the lateral guide piece 54b is composed of a pair of left and right lateral guide pieces 54b and 54b for rotating the arm.

As shown in FIGS. 7A to 8, each spring portion 52 and each guide portion 54 of the pair of terminals 50 and 50 are positioned in the hollow portion 44 between the housing body 42 and the center wall 45 of the housing 41. The spring portions 52 are arranged opposite to each other, and the guide portions 54 are arranged opposite to each other.

As shown in FIG. 2, the connector 40 is adapted to be fitted into a connector 62 connected to a power supply connection wire 61 toward the roof trim 60. At the time of this fitting, each terminal connection part 51 of the pair of terminals 50 and 50 of the connector 40 and the pair of terminals (not shown) of the connector 62 toward the roof trim 60 are electrically connected, and electric power is supplied to the pair of terminals 50 and 50 of the connector 40.

Further, as shown in FIG. 2, when the sun visor body 11 is stored toward the roof trim 60, and when the sun visor body 11 is folded down in front of the front window, the pair of arcuate-plate shape contact parts 29 and 29 provided on the outer peripheral surface 21b of the cylindrical-end portion 21 is brought into contact (conducting) with the contact portion 53 of each spring portion 52 of the pair of terminals 50 and 50 for supplying electric power to be in a conducting (ON) state. Then, the conductive circuit connecting the pair of conductors 28 and 28 routed in the arm 20 and the illumination lamp 13 of the sun visor body 11 is in a conducting state, whereby the lighting preparation state of the illumination lamp 13 of the sun visor body 11 is generated. In this lighting preparation state, when a cover (slide member) 14 covering a vanity mirror 12 of the sun visor body 11 is opened by sliding, the switch mechanism (not shown) is turned on, and the illumination lamp 13 is turned on. Further, when the sun visor body 11 is folded to the side of the side window, the pair of arcuate-plate shape contact parts 29 and 29 provided on the outer peripheral surface 21b of the cylindrical-end portion 21 is away from the contact portion 53 of each spring portion 52 of the pair of terminals 50 and 50 for supplying electric power to be in a non-conducting state, so that the conductive circuit of the illumination lamp 13 is in a non-conducting (OFF) state.

According to the vehicle sun visor 10 of the embodiment as described above, when the vehicle sun visor 10 is assembled, first, as shown in FIG. 3, the cylindrical-end portion 21 of the arm 20 is press-fitted to a circular inner peripheral surface 31a formed obliquely in the arm-supporting portion 31 of the mounting bracket 30. By this press-fitting, as shown in FIG. 7B, the locking protrusion 32 protruding from the inner peripheral surface 31a of the arm-supporting portion 31 enters the annular recessed engagement groove 25 of the arm 20, and is engaged with the annular flange portion 24, and the cylindrical-end portion 21 of the arm 20 is rotatably supported on the arm-supporting portion 31.

Next, as shown in FIG. 4, after the pair of terminals 50 and 50 is inserted into the housing 41 of the connector 40, as shown in FIG. 5, the pair of arcuate recessed groove portions 22 and 22 for assembling the connector of the cylindrical-end portion 21 of the arm 20, wherein the pair of arcuate recessed groove portions 22 and 22 is exposed outside the arm-supporting portion 31 of the mounting bracket 30, is positioned to be faced with the both side walls 43 and 43 of the connector 40. In this state, as shown in FIG. 6, the pair of locking piece portions 43b and 43b provided on the both side walls 43 and 43 of the housing 41 of the connector 40 is inserted into the pair of engagement holes 36 and 36 provided in the recess 35 for assembling the connector wherein the recess is provided on the upper surface 30a of the mounting bracket 30, and the connector 40 is rotated to lock the locking piece portion 42a of the housing body 42 of the connector 40 to the locking claw portion 37 of the recess 35 for assembling the connector, as shown by the arrow in FIG. 6, so that the connector 40 is attached to the upper surface 30a of the mounting bracket 30.

At this time, as shown in FIG. 7A, the arm body 20A of the arm 20 is located just below; the mounting hole 33 of the mounting bracket 30, and as shown in FIGS. 7B and 7C, each contact portion 53 of the pair of terminals 50 and 50 assembled to the connector 40 passes the pair of arcuate recessed groove portions 22 and 22 on the outer peripheral surface 21b of the cylindrical-end portion 21 of the arm 20, and the connector 40 can be assembled to the mounting bracket 30 while each contact portion 53 does not contact the pair of arcuate-plate shape contact parts 29 and 29 on the outer peripheral surface 21b of the cylindrical-end portion 21. The pair of arcuate-plate shape contact parts 29 and 29 is provided so as to be flush with the outer peripheral surface 21b of the cylindrical-end portion 21. That is, even when the arm body 20A of the arm 20 is not positioned just below the mounting hole 33 of the mounting bracket 30, and the contact portion 53 of the terminal 50 does not passes the arcuate recessed groove portion 22 of the cylindrical-end portion 21, since the pair of arcuate-plate shaped contact parts 29 and 29 does not protrude outward from the outer peripheral surface 21b, the pair of arcuate-plate shape contact parts 29 and 29 and the contact portion 53 of each spring portion 52 of the pair of terminals 50 and 50 do not interfere with each other even if they come into contact with each other. Thus, deformation of each spring portion 52 of the pair of terminals 50 and 50 can be prevented. In this manner, restriction of the installation direction makes it possible to mass-produce the high-quality vehicle sun visor 10.

Further, as shown in FIGS. 7B and 7C, the lower guide piece 54a of each guide portion 54 of the pair of terminals 50 and 50 of the connector 40, wherein the lower guide piece 54a is provided for assembling the connector, rides on each slope 23a on the upper sides of the pair of spring-portion-displacing protrusions 23 and 23 formed on the cylindrical-end portion 21 of the arm 20, so that the contact portion 53 provided at the distal end of each spring portion 52 of the pair of terminals 50 and 50 can be lifted. According to this configuration, each contact portion 53 of the pair of terminals 50 and 50 of the connector 40 does not come into contact with the pair of arcuate-plate shape contact parts 29 and 29 of the cylindrical-end portion 21 of the arm 20, and it is possible to protect the pair of terminals 50 and 50 without deforming each spring portion 52. By preventing each spring portion 52 of the pair of terminals 50 and 50 from deforming, it is possible to prevent conduction failure and resistance instability from occurring.

Further, as shown in FIG. 9A, even when the arm 20 rotates such that the arm body 20A of the arm 20 slightly rotates from a position just below the mounting hole 33 of the mounting bracket 30, as shown in FIGS. 9B and 9C, the lateral guide piece 54b for arm rotation of each guide portion 54 of the pair of terminals 50 and 50 rides on each slope 23b on the lateral side of the pair of protrusions 23 and 23 of the cylindrical-end portion 21 of the arm 20, so that the contact portion 53 of each spring portion 52 of the pair of terminals 50 and 50 can be lifted. As a result, each contact portion 53 of the pair of terminals 50 and 50 of the connector 40 does not come into contact with the pair of arcuate-plate shape contact parts 29 and 29 of the cylindrical-end portion 21 of the arm 20, and it is possible to protect the pair of terminals 50 and 50 without deforming each spring portion 52. By preventing each spring portion 52 of the pair of terminals 50 and 50 from deforming, it is possible to prevent conduction failure and resistance instability from occurring.

In the present embodiment, the pair of arcuate-plate shape contact parts 29 and 29 is provided on the outer peripheral surface 21b of the cylindrical-end portion 21 of the arm 20 via a pair of gaps S and S, the pair of arcuate recessed groove portions 22 and 22 for mounting a connector is provided in the gaps S and S, and the spring-portion-displacing protrusion 23 which lifts each contact portion 53 of the pair of terminals 50 and 50 is provided under the pair of arcuate recessed groove portions 22 and 22. According to this configuration, the space between the respective spring portions 52 of the pair of terminals 50 and 50 can be made as narrowly as possible, the diameter of the connector 40 can be reduced, and the entire vehicle sun visor 10 can be downsized.

In addition, as shown in FIG. 3 and FIGS. 9A to 9C, in the present embodiment, on the lower side of the pair of arcuate recessed groove portions 22 and 22 of the outer peripheral surface 21b of the cylindrical-end portion 21 of the arm 20 wherein the arcuate recessed groove portions 22 and 22 are provided for mounting the connector, the spring-portion-displacing protrusion 23 which lifts the contact portion 53 provided at the distal end of the spring portion 52 of the pair of terminals 50 and 50 for supplying electric power, wherein the spring portion 52 elastically deforms, is provided, the guide portion 54 is provided at a position of each spring portion 52 of the pair of terminals 50 and 50 of the connector 40 wherein the position is faced with the spring-portion-displacing protrusion 23 formed on the cylindrical-end portion 21 of the arm 20, and each contact portion 53 of the pair of terminals 50 and 50 is away from the pair of arcuate-plate shape contact parts 29 and 29 provided on the outer peripheral surface 21b of the cylindrical-end portion 21 of the arm 20 to be in a non-conducting state. According to this configuration, the pair of arcuate-plate shape contact parts 29 and 29 of the cylindrical-end portion 21 of the arm 20 and each contact portion 53 of the pair of terminals 50 and 50 of the connector 40 can be reliably spaced away from each other. In this manner, the contact portion 53 of the terminal 50 comes into contact with the only mating arcuate-plate shape contact part 29, so that it is possible to keep stable contact without the attachment of foreign matter to the contact portion 53.

Further, as shown in FIGS. 7A to 7C and FIGS. 9A to 9C, the lower guide piece 54a for assembling the connector and a pair of left and right lateral guide pieces 54b and 54b for rotating the arm are provided on respective guide portions 54 of the pair of terminals 50 and 50 of the connector 40, and each guide portion 54 of the pair of terminals 50 and 50 is elastically deformed by the spring-portion-displacing protrusion 23 provided on the cylindrical-end portion 21 of the arm 20. According to this configuration, it is possible to smoothly displace each guide portion 54 of the pair of terminals 50 and 50 when the housing 41 of the connector 40 is assembled and the arm 20 is rotated.

According to the above embodiment, the sun visor body is provided with an illumination lamp as an electrical component. The sun visor body may be provided with a compact and thin liquid crystal monitor or the like as an electrical component.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. A vehicle sun visor comprising:
a sun visor body including an electrical component;
a non-conductive arm comprising a cylindrical-end portion on which contact parts of a pair of conductors are arranged and rotatably holding the sun visor body;
a mounting bracket configured to mount the non-conductive arm to a vehicle; and
a connector detachably attached to the mounting bracket and including a pair of terminals each having a contact portion to contact with a corresponding contact part of the pair of conductors and configured to supply electric power, wherein
the mounting bracket comprises an arm-supporting portion rotatably supporting a cylindrical-end-portion side of the non-conductive arm,
the contact parts of the pair of conductors are formed in an arcuate-plate shape,
the pair of arcuate-plate shape contact parts is arranged via a gap on an outer peripheral surface of the cylindrical-end portion exposed outside the arm-supporting portion of the non-conductive arm, and
a recess for attaching the connector is provided in the gap between the pair of arcuate-plate shape contact parts on the outer peripheral surface of the cylindrical-end portion of the non-conductive arm.

2. The vehicle sun visor according to claim 1,
wherein a spring-portion-displacing protrusion configured to lift the contact portion provided on a spring portion of the terminal wherein the spring portion elastically deforms is provided on a lower position of the recess for attaching the connector wherein the recess is provided on the cylindrical-end portion of the non-conductive arm.

3. The vehicle sun visor according to claim 2,
wherein a guide portion is provided at a position of the spring portion wherein the position is faced with the spring-portion-displacing protrusion.

4. The vehicle sun visor according to claim 3,
wherein a lower guide piece configured to guide the spring portion when attaching the connector and a lateral guide piece configured to guide the spring portion when rotating the non-conductive arm are provided on the guide portion of the terminal.

* * * * *